(12) United States Patent
Wakita (10) Patent No.: US 9,050,966 B2
(45) Date of Patent: Jun. 9, 2015

(54) CONTROL DEVICE AND METHOD FOR VEHICLE

(75) Inventor: Kazuyoshi Wakita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 304 days.

(21) Appl. No.: 13/574,220

(22) PCT Filed: Dec. 22, 2010

(86) PCT No.: PCT/JP2010/073155
§ 371 (c)(1),
(2), (4) Date: Jul. 19, 2012

(87) PCT Pub. No.: WO2011/089818
PCT Pub. Date: Jul. 28, 2011

(65) Prior Publication Data
US 2012/0296509 A1    Nov. 22, 2012

(30) Foreign Application Priority Data
Jan. 20, 2010 (JP) ................................ 2010-010293

(51) Int. Cl.
| | |
|---|---|
| *B60W 10/10* | (2012.01) |
| *B60W 10/06* | (2006.01) |
| *B60W 10/115* | (2012.01) |
| *B60W 30/192* | (2012.01) |
| *F16H 61/00* | (2006.01) |
| *F16H 61/12* | (2010.01) |
| *F16H 63/50* | (2006.01) |
| *B60W 10/02* | (2006.01) |
| *B60W 20/00* | (2006.01) |
| *F02N 11/08* | (2006.01) |
| *F02D 29/00* | (2006.01) |
| *F02D 29/02* | (2006.01) |

(52) U.S. Cl.
CPC ............ *B60W 10/06* (2013.01); *B60W 10/115* (2013.01); *B60W 30/192* (2013.01); *F16H 61/0031* (2013.01); *F16H 61/12* (2013.01); *F16H 63/50* (2013.01); *F16H 2312/14* (2013.01); *B60W 10/02* (2013.01); *B60W 2510/107* (2013.01); *B60W 20/50* (2013.01); *B60Y 2400/76* (2013.01); *F16H 2312/02* (2013.01); *F02D 29/00* (2013.01); *F02D 29/02* (2013.01); *F02N 11/0833* (2013.01); *Y02T 10/48* (2013.01)

(58) Field of Classification Search
CPC ............ B60K 6/08; B60K 6/20; B60K 6/22; B60K 6/24; B60K 6/26; B60K 6/28; B60K 6/30; B60K 6/32; B60K 6/34; B60K 6/36; B60K 6/365; B60K 6/38; B60K 6/42; B60K 6/44; B60K 6/442; B60K 6/445; B60K 6/448; B60K 6/46; B60K 6/48; B60K 6/485; B60W 10/00; B60W 10/02; B60W 10/023; B60W 10/026; B60W 10/04; B60W 10/06; B60W 10/08; B60W 10/10; B60W 10/101; B60W 10/103; B60W 10/105; B60W 10/107; B60W 10/108; B60W 10/109; B60W 10/11; B60W 10/111; B60W 10/113; B60W 10/115; B60W 20/00; B60W 20/10; B60W 20/108; B60W 20/1082; B60W 20/1084; B60W 20/1086; B60W 20/1088; B60W 20/20; B60W 20/30; B60W 20/40; B60W 20/50; B60W 2510/0638; B60W 2510/0642; B60W 2510/0647; B60W 2510/0652; B60W 2510/09; B60W 2510/10; B60W 2510/1005; B60W 2510/101; B60W 2510/1015; B60W 2510/102; B60W 2510/1025; B60W 2510/103; B60W 2510/1035; B60W 2510/104; B60W 2510/1045; B60W 2510/107; B60W 2510/1075; B60W 2510/108; B60W 2510/1085; B60W 30/18; B60W 30/18009; B60W 30/18018; B60W 30/18027; B60W 30/18036; B60W 30/18045; B60W 30/18054; B60W 30/18063; B60W 30/18072; B60W 30/181; B60W 30/18109; B60W 30/18118; B60W 30/18127; B60W 30/18136; B60W 30/18145; B60W 30/18154; B60W 30/18163; B60W 30/18172; B60W 30/18181; B60W 30/1819; B60W 30/182; B60W 30/184;
B60W 30/1843; B60W 30/1846; B60W
30/186; B60W 30/188; B60W 30/1882;
B60W 30/1884; B60W 30/1886; B60W
30/1888; B60W 30/19; B60Y 2400/76;
F02N 11/00; F02N 11/003; F02N 11/0814;
F02N 11/0818; F02N 11/0825; F02N 11/0829;
F02N 11/0833; F02N 11/084; F02N 11/0844;
F02N 11/0848; F02N 11/0851; F02N 11/0855;
F02N 11/0859; F02N 11/0862; F02N 11/10;
F02N 11/101; F02N 11/103; F02N 11/105;
F02N 11/106; F02N 11/108; F02N 11/12;
F02N 11/14; F16H 2312/00; F16H 2312/02;
F16H 2312/022; F16H 2312/04; F16H
2312/06; F16H 2312/08; F16H 2312/09;
F16H 2312/10; F16H 2312/12; F16H 2312/14;
F16H 2312/16; F16H 2312/18; F16H 2312/20;
F16H 61/0003; F16H 61/0006; F16H 61/0009;
F16H 61/0021; F16H 61/0025; F16H 61/0028;
F16H 61/0031; F16H 61/12; F16H 63/40;
F16H 63/50; F16H 63/502
USPC .............................................. 701/22, 51–68
See application file for complete search history.

(56) References Cited

U.S. PATENT DOCUMENTS

| 2004/0029677 | A1 | 2/2004 | Mori et al. |
| 2005/0170929 | A1 | 8/2005 | Ito et al. |
| 2006/0189436 | A1* | 8/2006 | Nakashima et al. .......... 477/174 |

FOREIGN PATENT DOCUMENTS

| CN | 1181322 | A | 5/1998 |
| CN | 1331780 | A | 1/2002 |
| EP | 0 839 683 | A2 | 5/1998 |
| EP | 1 143 134 | A1 | 10/2001 |
| JP | H08-14076 | A | 1/1996 |
| JP | 2000-035121 | A | 2/2000 |
| JP | 2004-340206 | A | 12/2004 |
| JP | 2005-273631 | A | 10/2005 |
| JP | 2006-152868 | A | 6/2006 |
| JP | 2009-191997 | A | 8/2009 |
| JP | 2009-262749 | A | 11/2009 |
| JP | 2010-216583 | A | 9/2010 |

OTHER PUBLICATIONS

Supplementary European Search Report, Application No. 10843982.9 dated Jul. 13, 2013.
Chinese Office Action dated Jun. 4, 2014, with full English language translation, for corresponding Chinese Patent Application No. 201080061792.3.
Second Notification of Office Action dated Feb. 27, 2015 corresponding to Chinese Patent Application No. 201080061792.3 and English translation thereof.

* cited by examiner

*Primary Examiner* — Jerrah Edwards
(74) *Attorney, Agent, or Firm* — Squire Patton Boggs (US) LLP (57) ABSTRACT

If an electric oil pump fails when an engine automatically stops under predetermined conditions, a gear that has been in engagement when the engine is automatically stopped is automatically disengaged and a clutch is automatically disengaged to thereby bring a transmission into a neutral state, and thereafter the engine is compulsorily re-started. After a sufficient hydraulic pressure of working fluid supplied to the transmission by activation of a mechanical oil pump accompanied by compulsory re-starting of the engine is secured, the disengaged gear and clutch are re-engaged. This eliminates a clutch engagement shock or clutch slipping due to an insufficient hydraulic pressure caused by a fault of the electric oil pump if it is necessary to compulsorily re-start the engine immediately after an automatic engine stop accompanying failure of the electric oil pump. Thus, a reduction in durability of the transmission is prevented.

3 Claims, 4 Drawing Sheets

CONTROL DEVICE AND METHOD FOR VEHICLE

CROSS-REFERENCE TO RELATED APPLICATION

This Application is a National Stage entry of International Application No. PCT/JP2010/073155 having an international filing date of Dec. 22, 2010; which claims priority to Japenese Application No.: 2010-010293, filed Jan. 20, 2010; the disclosure of each of which is hereby incorporated in its entirety by reference.

TECHNICAL FIELD

The present invention relates to a control device for a vehicle that drives an electric oil pump at the same time as an engine is automatically stopped when the vehicle is stationary. The present invention relates in particular to a technique for preventing a reduction in durability of an automatic transmission due to clutch slipping or the like that may occur when a fault (faulty drive) occurs in the electric oil pump and the engine which has been automatically stopped is immediately compulsorily started.

BACKGROUND ART

Hitherto, there is known a control device for a vehicle that performs so-called "idle stop", in which supply of fuel is stopped to automatically stop an engine, under predetermined conditions such as when the vehicle is temporarily stationary while waiting for a traffic light to change, for example, for the purpose of improving fuel efficiency, reducing gas emission, or the like.

In a vehicle including an engine, in general, a hydraulic pressure (referred to as "shifting hydraulic pressure") of working fluid (ATF) required to control a hydraulic pressure to be supplied to an automatic transmission is secured by a mechanical oil pump driven mechanically by the engine. In the case where idle stop is performed, however, the mechanical oil pump is of course stopped at the same time as the engine is stopped, and thus the shifting hydraulic pressure cannot be secured. That is, the shifting hydraulic pressure is reduced in a hydraulic pressure control circuit provided in the automatic transmission, resulting in an insufficient hydraulic pressure. Consequently, a forward clutch (which may be referred to simply as "clutch") is disengaged or half-engaged with a first gear (so-called "low gear") among forward gears (speed shift gears) kept in-gear (engaged) in the transmission. Re-starting the engine in this state is very inconvenient because the clutch is likely to slip or a clutch engagement shock may be caused because a hydraulic pressure which has been abruptly raised by operation of the mechanical oil pump and which is under no control is supplied to the forward clutch as an engagement hydraulic pressure.

Thus, in the related art, in order to secure the shifting hydraulic pressure during idle stop, an electric oil pump driven by a motor is provided separately from the mechanical oil pump, and is activated at the same time as the engine is automatically stopped. An example of this technique is disclosed in Patent Literature 1.

Patent Literature 2 discloses a control device for a vehicle that compulsorily re-starts an engine immediately after the engine is automatically stopped, upon detecting a fault (faulty drive) of an electric oil pump activated at the same time as the engine is automatically stopped. This aims at minimizing a reduction in shifting hydraulic pressure accompanied by engine stop by compulsorily starting the engine to drive the mechanical oil pump immediately after the engine is automatically stopped, because the shifting hydraulic pressure cannot be secured if the electric oil pump cannot be activated because of a fault.

Patent Literature 1 JP-A-2006-170399
Patent Literature 2 JP-B-4226543

In the control device according to the related art described in Patent Document 2 discussed above, the engine is immediately compulsorily started when a fault of the electric oil pump is detected irrespective of whether or not a hydraulic pressure (shifting hydraulic pressure) of working fluid required to control a hydraulic pressure to be supplied to the automatic transmission is secured. However, the shifting hydraulic pressure is not always secured when the engine is compulsorily started along with a fault of the electric oil pump, and the engine may be re-started with the shifting hydraulic pressure not secured (that is, at an insufficient hydraulic pressure). In such a case, a clutch engagement shock or clutch slipping may be caused as described above, which may inconveniently result in a reduction in durability of the automatic transmission. In this case, the durability of the automatic transmission may be gradually progressively reduced each time the vehicle becomes temporarily stationary to wait for a traffic light to change before a user finds the fault of the electric oil pump to have the electric oil pump repaired at a service station or the like.

SUMMARY OF THE INVENTION

The present invention has been made in view of the foregoing, and therefore has an object to provide a control device and a method for a vehicle that minimize a reduction in durability of an automatic transmission due to a clutch engagement shock or clutch slipping that may be caused by an insufficient hydraulic pressure of working fluid to be supplied to the automatic transmission in the case where an electric oil pump activated at the same time as an engine is automatically stopped is faulty.

In order to achieve the foregoing object, the present invention provides a control device (8) for a vehicle, the vehicle (1) having power sources for driving the vehicle which include an engine (2) driven by combustion of fuel and an electric motor (3) driven by electric energy, the vehicle further including a transmission (6) disposed in a power transfer mechanism provided between at least either one of the engine (2) or the electric motor (3) and a drive wheel (W), a mechanical-type oil pump (11) driven by the engine (2) to supply working fluid to the transmission (6), and an electrically driven-type oil pump (12) driven by an electric motor (13) to supply working fluid to the transmission (6), the control device (8) comprising: an automatic stopping section (S1, S2) that automatically stops the engine (2) under predetermined conditions; a fault determination section (S4, S5) that determines whether the electrically driven-type oil pump (12) is faulty or not; a compulsory starting section (S7, S11-S15) that in the case where it is determined by the fault determination section that the electrically driven-type oil pump (12) is faulty, disengages a gear that has been in engagement when the engine (2) is automatically stopped and disengages a clutch to thereby bring the transmission (6) into a neutral state, and thereafter compulsorily re-start the engine (2) which has been automatically stopped; and a re-engagement section (S18) that re-engages the disengaged gear and engages the clutch after a hydraulic pressure of working fluid supplied to the transmission (6) by the mechanical-type oil pump (11) activated along with re-starting of the engine (2) has become equal to or more than a predetermined value.

According to the invention, it is determined whether or not the electric oil pump (12) is faulty when the engine (2) is automatically stopped under predetermined conditions, and in the case where the electric oil pump (12) is faulty, the gear that has been in engagement when the engine (2) is automatically stopped is automatically disengaged and the clutch is automatically disengaged to thereby bring the transmission (6) into the neutral state, and thereafter the engine (2) is compulsorily re-started. Then, after a sufficient hydraulic pressure of working fluid supplied to the transmission (6) is secured by activation of the mechanical oil pump (11) accompanied by the compulsory re-starting of the engine (2), the disengaged gear is re-engaged and the clutch is engaged. This eliminates a clutch engagement shock or clutch slipping due to an insufficient hydraulic pressure caused by a fault of the electric oil pump (12) in the case where it is necessary to compulsorily start the engine (2) immediately after the engine (2) is automatically stopped because of the fault of the electric oil pump (12). Thus, a reduction in durability of the transmission (6) is prevented.

The reference numerals provided above in the parentheses illustratively indicate corresponding constituent elements provided in an embodiment to be discussed later for reference.

According to the present invention, in the case where the electric oil pump is faulty, a gear which has been in-gear (engaged) is released (disengaged) and the clutch is disengaged to bring the transmission into the neutral state and thereafter compulsorily start the engine, and the gear becomes in-gear (re-engaged) and the clutch is engaged after a sufficient hydraulic pressure supplied to the transmission is secured by activation of the mechanical-type oil pump accompanied by re-starting of the engine. This prevents a reduction in durability of an automatic transmission due to a clutch engagement shock of clutch slipping caused by an insufficient hydraulic pressure that may occur when the engine which has been automatically stopped is immediately compulsorily started.

DETAILED DESCRIPTION OF THE INVENTION

An embodiment of the present invention will be described in detail below with reference to the accompanying drawings.

Figure 1:
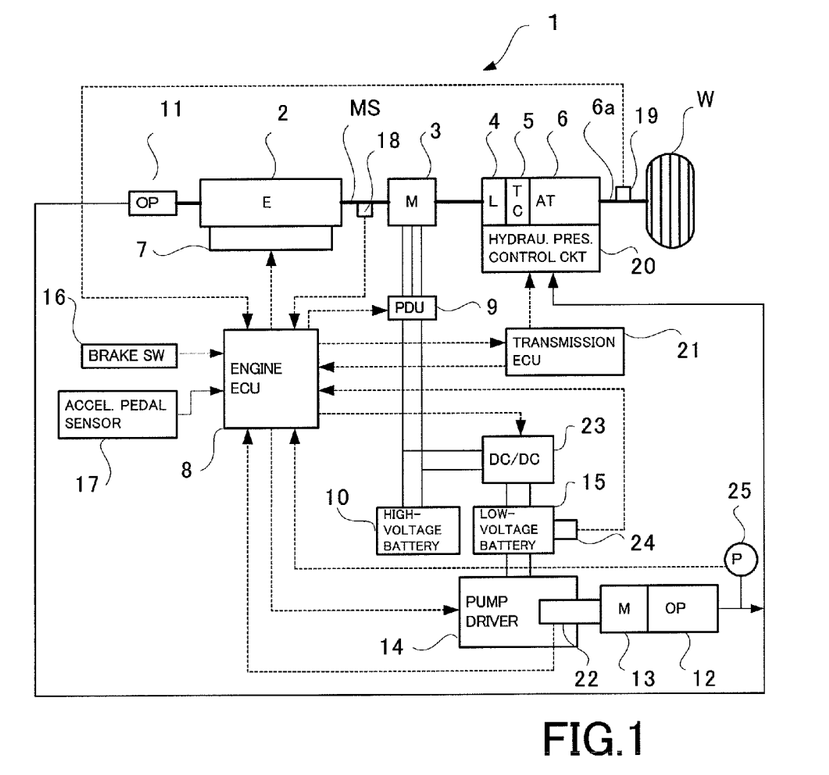
FIG. 1 is a schematic diagram showing a power transfer system of a hybrid vehicle to which a control device for a vehicle according to an embodiment of the present invention is applied.

FIG. 1 is a schematic diagram showing a power transfer system of a hybrid vehicle 1 to which a control device for a vehicle according to an embodiment of the present invention is applied. In the hybrid vehicle 1 shown in FIG. 1, an engine 2 and a motor 3 that can generate electricity (hereinafter referred to as "motor generator" for differentiation from an electric motor 13 to be discussed later) are directly coupled to each other. A drive force produced by at least either one of the engine 2 and the motor generator 3 is transferred to an output shaft 6a via a main shaft MS, a torque converter 5 including a lock-up clutch 4, a multi-speed automatic transmission 6, and so forth. Then, the drive force transferred to the output shaft 6a is further transferred to a drive wheel W of the vehicle via a differential mechanism (not shown) and so forth to rotate the drive wheel W. That is, the main shaft MS and the output shaft 6a form a power transfer path through which a drive force produced by at least either one of the engine 2 and the motor generator 3 is transferred to the drive wheel W of the vehicle.

The engine 2 which produces a drive force is a multi-cylinder reciprocating engine, for example, and includes a fuel injection/ignition control device 7 that controls fuel injection and injected fuel ignition for each cylinder. In the embodiment, an electronically controlled throttle system (so-called "drive-by-wire system", abbreviated as "DBW system") is adopted, and operation of throttle valves (not shown) of the engine 2 is electronically controlled by an engine ECU 8 (engine electronic control unit) on the basis of the amount of depression of an accelerator pedal. Operation of the fuel injection/ignition control device 7 is also controlled by the engine ECU 8.

The engine ECU 8 is a microcomputer that is formed to include a CPU, a ROM, a RAM, an input/output interface, and so forth and that achieves predetermined functions in accordance with various control programs stored in the ROM using a temporary storage function of the RAM. In the embodiment, the engine ECU 8 functions as the control device for a vehicle according to the present invention, and executes an engine control process (see FIG. 2) to be discussed later to control operation of the fuel injection/ignition control device 7 and so forth so as to automatically stop and compulsorily start the engine 2 under predetermined conditions.

To this end, the engine ECU 8 receives output signals from a brake switch 16 that detects whether or not a brake pedal is depressed, an accelerator pedal sensor 17 that detects the amount of depression of the accelerator pedal, an engine (or main shaft) speed sensor 18 that detects the rotational speed of the engine 2 or the rotational speed of an output shaft (main shaft MS) to which rotation of the engine 2 is transferred, an output shaft rotational speed sensor 19 that detects the rotational speed of the output shaft 6a of the transmission 6, and so forth. The speed of the vehicle may be calculated on the basis of the rotational speed of the output shaft 6a detected by the output shaft rotational speed sensor 19, or may be detected using a dedicated speed sensor.

The torque converter 5 transfers torque between the output shaft of the motor generator 3 and the input shaft of the transmission 6 via a fluid when the lock-up clutch 4 is disengaged. When the lock-up clutch 4 is engaged, the output shaft of the motor generator 3 and the input shaft of the transmission 6 are substantially directly coupled to each other so that torque is directly transferred, and not via the fluid, between the output shaft and the input shaft. Engagement/disengagement of the lock-up clutch 4, shifting of the transmission 6, and so forth are performed through hydraulic pressure control by a hydraulic pressure control circuit 20.

As known in the art, the hydraulic pressure control circuit 20 includes a manual valve (not shown) that is driven in conjunction with a shift lever provided at the driver's seat to switch among basic working fluid (ATF) passages for forward travel, neutral, and reverse travel, a regulator valve (not shown) that supplies a predetermined line pressure generated by regulating the discharge pressure of a mechanical oil pump 11 to the manual valve, a plurality of shift valves (not shown) that control the working fluid passages and the hydraulic pressure in accordance with the gear position, and a plurality of solenoid valves (not shown) that control the pilot pressure of the shift valves. The shift valves control the working fluid passages and the hydraulic pressure to control operation of clutches and brakes (none of which is shown) of the transmission 6 so as to automatically optimally control the gear position of the transmission 6. The manual valve, the regulator valve, the shift valves, and the solenoid valves are controlled by a transmission ECU 21.

In the hybrid vehicle 1, when a drive force is transferred from the drive wheel W to the motor generator 3 during deceleration, a high-voltage battery 10 can be charged via the motor generator 3 and a power drive unit (PDU) 9. That is, the motor generator 3 performs regeneration to recover kinetic energy of the vehicle body as electric energy. Such power running and regeneration performed by the motor generator 3 are controlled by the engine ECU 8 via the PDU 9. The PDU 9 and the high-voltage battery 10 are connected to a low-voltage battery (power source) 15 via a DC/DC converter 23 so that the low-voltage battery 15 can be charged using a reduced voltage. A remaining capacity gauge 24 detects the remaining capacity of the low-voltage battery 15 to output the detected remaining capacity (detected value) to the engine ECU 8. The engine ECU 8 controls the DC/DC converter 23 on the basis of the value detected by the remaining capacity gauge 24 to charge the low-voltage battery 15. A capacitor may be used in place of the high-voltage battery 10.

The hybrid vehicle 1 includes, as sources of a hydraulic pressure to be supplied to the hydraulic pressure control circuit 20, a mechanical oil pump 11 and an electric oil pump 12 having a capacity lower than that of the mechanical oil pump 11. The mechanical oil pump 11 is coupled to the output shaft (main shaft MS) of the engine 2, and mechanically driven by a drive force of the engine 2 or the motor generator 3. On the other hand, the electric oil pump 12 is driven by the electric motor 13, and basically driven when the mechanical oil pump 11 cannot be driven, because the engine 2 and the motor generator 3 are stopped. That is, when conditions for stopping the engine 2 are met, the engine ECU 8 supplies electric power of the low-voltage battery 15 via a pump driver 14 to start the electric motor 13 to drive the electric oil pump 12. On the other hand, when conditions for re-starting the engine 2 are met, the engine ECU 8 stops supply of electric power of the low-voltage battery 15 via the pump driver 14 to stop the electric motor 13 to stop the electric oil pump 12.

A hydraulic pressure sensor 25 that detects a discharge pressure is provided at a discharge pipe of the electric oil pump 12. The hydraulic pressure sensor 25 outputs an electric signal matching the detected discharge pressure to the engine ECU 8. The pump driver 14 which supplies electric power of the low-voltage battery 15 to the electric motor 13 includes a current sensor 22 that detects a current that flows through the electric motor 13. The current sensor 22 outputs an electric signal corresponding to the magnitude of the detected current to the engine ECU 8.

The engine ECU 8 and the transmission ECU 21 are connected to each other so that they can mutually exchange information required to execute their control. For example, information required to control the transmission 6 (such as the driving state of the vehicle, and whether forward gears are prohibited or prohibition of forward gears is canceled, for example) is transmitted from the engine ECU 8 to the transmission ECU 21, and information required to control the engine 2 (such as the gear position of the transmission 6, for example) is transmitted from the transmission ECU 21 to the engine ECU 8.

Figure 2:
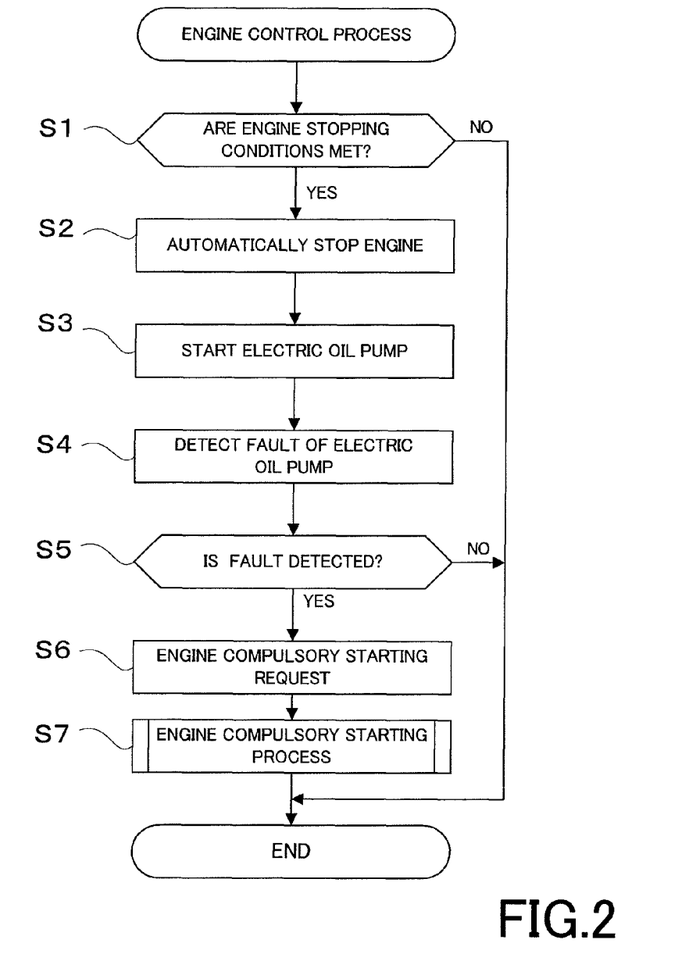
FIG. 2 is a flowchart showing an engine control process according to the embodiment.
Figure 3:
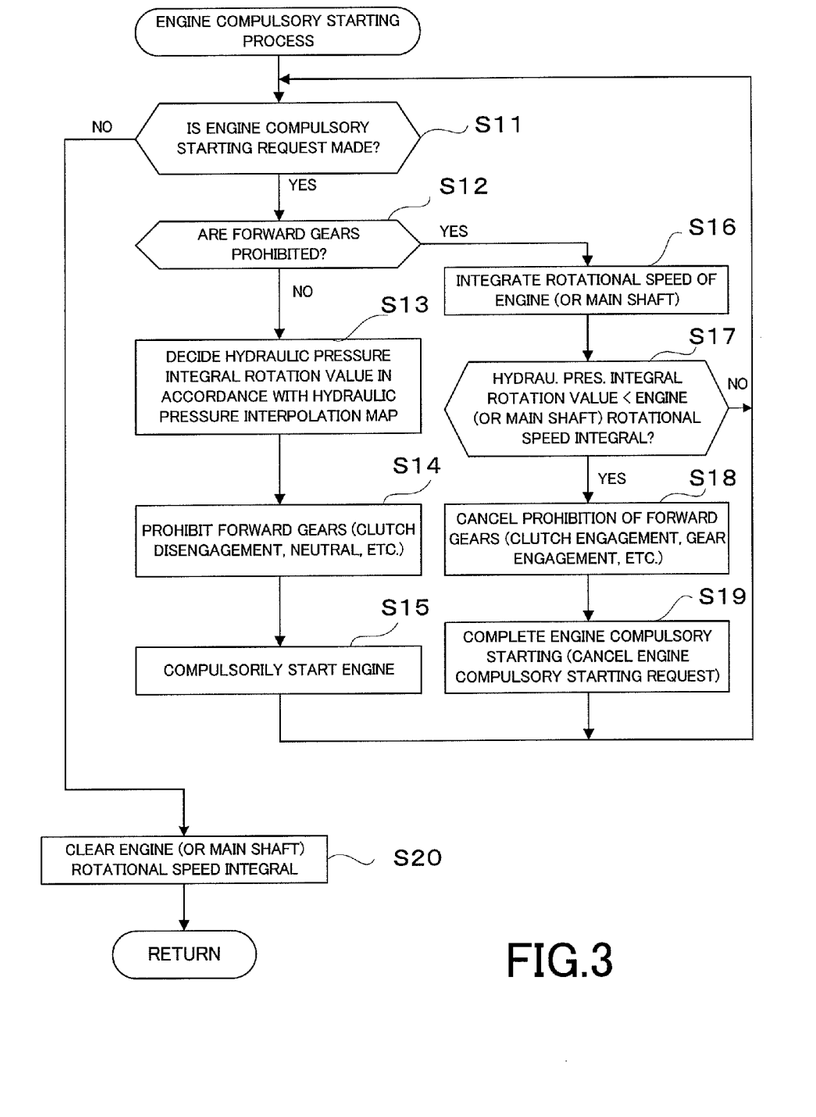
FIG. 3 is a flowchart showing an engine compulsory starting process according to the embodiment.
Figure 4:
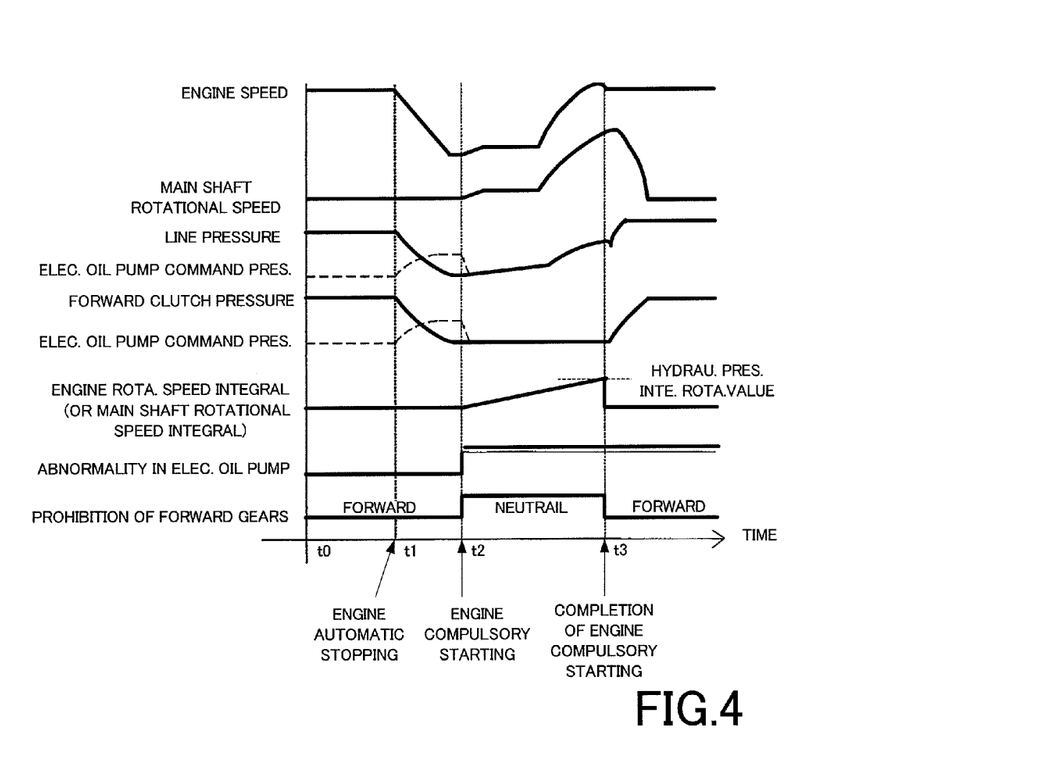
FIG. 4 is a time chart for engine automatic stopping and engine compulsory starting.

Next, an engine control process that achieves engine automatic stopping and engine compulsory starting in the hybrid vehicle 1 shown in FIG. 1 configured as discussed above will be described with reference to FIG. 2 to FIG. 4. FIG. 2 is a flowchart showing an engine control process according to the embodiment. FIG. 3 is a flowchart showing an engine compulsory starting process according to the embodiment. These processes are executed by a computer of the engine ECU 8. A program that causes the computer to execute the processes is stored in an appropriate storage medium such as a ROM or a RAM. FIG. 4 is a time chart for engine automatic stopping and engine compulsory starting.

In step S1, it is determined whether or not engine stopping conditions are met. The engine stopping conditions may be: the brake switch is "ON"; the amount of depression of the accelerator pedal is "0"; and the vehicle speed is equal to or less than a vehicle speed at which engine stop is permitted (for example, 15 km/h), for example. When these conditions are met, it is determined that the engine stopping conditions are met. When it is determined that the engine stopping conditions described above are not satisfied (NO in step S1), the process is terminated. On the other hand, when it is determined that the engine stopping conditions described above are satisfied (YES in step S1), operation of the fuel injection/ignition control device 7 is controlled to automatically stop the engine 2 (step S2). Then, the electric oil pump 12 is started (step S3). The function of the "automatic stopping section" is implemented by the processes in steps S1 and S2.

As shown in FIG. 4, when the engine 2 is automatically stopped as the vehicle is temporarily stopped (at time t0), the engine speed starts reducing at time t1 at which the engine 2 is automatically stopped. Accordingly, the discharge pressure (not shown) of the mechanical oil pump 11 is also reduced, along with which the line pressure supplied to the manual valve is reduced, resulting in an insufficient hydraulic pressure to reduce the forward clutch pressure. When the forward clutch pressure is reduced, the forward clutch is inconveniently disengaged or half-engaged keeping a first gear (first speed gear) in an in-gear condition as described above.

Thus, in order not to cause such an insufficient hydraulic pressure along with automatic stopping of the engine 2, the electric oil pump 12 is driven so as to supply the hydraulic pressure control circuit 20 with a hydraulic pressure (electric oil pump command pressure) that compensates for a reduction in line pressure (or a reduction in forward clutch pressure) (time t1). At this time, if the electric oil pump 12 is not faulty, a hydraulic pressure is supplied from the electric oil pump 12 in accordance with the electric oil pump command pressure, and thus the line pressure (or the forward clutch pressure) is not reduced. In the case where the electric oil pump 12 is faulty, however, a hydraulic pressure is not supplied from the electric oil pump 12 to the hydraulic pressure control circuit 20, and thus the line pressure (or the forward clutch pressure) continues reducing to the lowest hydraulic pressure (for example, 0) as shown in the drawing (see time t1 to time t2).

Next, in step S4, a fault of the electric oil pump 12 is detected. A fault of the electric oil pump 12 may be detected in the case where a hydraulic pressure (electric oil pump command pressure) required to maintain the clutch in the engaged state cannot be supplied to the hydraulic pressure control circuit 20, and may include not only a mechanical fault of the electric oil pump and the electric motor 13 but also an abnormality in current of the electric motor 13, a faulty state of the low-voltage battery 15 which supplies electric power to the electric motor 13, an abnormality in communication between the pump driver 14 and the engine ECU 8, and so forth. The fault detection includes processes for detecting all such faults.

The mechanical fault of the electric oil pump 12 and the electric motor 13 can be detected on the basis of the discharge pressure of the electric oil pump 12 detected by the hydraulic pressure sensor 25, for example. The abnormality in current of the electric motor 13 can be detected on the basis of the value of the current detected by the current sensor 22. Such an abnormality in current may be caused by a short circuit, a fixed closure of contact points, a wire breakage, or the like in a drive circuit in the electric motor 13. The faulty state of the low-voltage battery 15 can be detected on the basis of the remaining capacity detected by the remaining capacity gauge 24.

In step S5, it is determined on the basis of the results of detecting a fault of the electric oil pump whether or not the electric oil pump 12 is faulty. In this case, the electric oil pump 12 may be determined faulty when any one of the following applies: mechanical fault of the electric oil pump 12 and the electric motor 13; abnormality in current of the electric motor 13; and abnormality in communication between the pump driver 14 and the engine ECU 8. When it is determined that the electric oil pump 12 is not faulty (NO in step S5), the process is terminated. In this case, the electric oil pump 12 is not faulty and operates normally. Thus, the discharge pressure of the electric oil pump 12 is gradually raised in accordance with the electric oil pump command pressure until a predetermined hydraulic pressure is reached. Accordingly, the forward clutch is maintained in an engagement condition keeping the first gear (first speed gear) in the in-gear condition when the electric oil pump 12 is not faulty. The function of the "fault determination section" is implemented by the processes in steps S4 and S5.

As is known in the art, in the case where the electric oil pump 12 is not faulty, the engine 2 is continuously stopped until the conditions for re-starting the engine 2 (such as the brake switch is "OFF" and the amount of depression of the accelerator pedal is equal to or more than a predetermined value, for example) are met. That is, in the case where the electric oil pump 12 is not faulty, the engine 2 is not started unless the driver has an intention and makes an operation to re-start the vehicle which has once become stationary. Then, in the case where the engine re-starting conditions are met, compulsory starting of the engine 2 (such as cranking of the engine 2 using the motor generator 3 and starting of fuel injection) is executed to re-start the engine 2, and the electric oil pump 12 is stopped. That is, re-starting of the engine 2 activates the mechanical oil pump 11, and thus the electric oil pump 12 is stopped.

On the other hand, in the case where it is determined in step S5 that the electric oil pump 12 is faulty (YES in step S5), an engine compulsory starting request is made (for example, a predetermined flag is set to 1) to execute an "engine compulsory starting process" to be discussed later (steps S6 and S7). In the case where the electric oil pump 12 is faulty, the engine 2 is cranked by the motor generator 3 to compulsorily start the engine 2 immediately after the engine is automatically stopped. That is, the engine 2 is re-started immediately after the engine 2 is substantially stopped without waiting for the engine re-starting conditions discussed above to be met, in other words, irrespective of whether or not the driver has an intention and makes an operation to re-start the vehicle which has once become stationary. When the electric oil pump 12 is faulty, unlike during normal operation, the discharge pressure of the electric oil pump 12 is not raised even if the electric oil pump 12 is started as discussed above, and the forward clutch cannot be maintained in the engagement condition while keeping the first gear (first speed gear) in the in-gear condition. Therefore, a clutch engagement shock or clutch slipping may be caused when the engine 2 is compulsorily started thereafter.

Thus, in the present invention, especially when the electric oil pump 12 is faulty, the in-gear condition of the first gear (first gear engagement) and the clutch engagement are automatically canceled to bring the transmission 6 into the neutral state and thereafter compulsorily start the engine 2, and the in-gear condition of the first gear (first gear engagement) and the clutch engagement is automatically established again from the neutral state after a sufficient hydraulic pressure is secured by operation of the mechanical oil pump 11 accompanied by re-starting of the engine 2. Since these processes are implemented within a relatively short time (time t2 to time t3 of FIG. 4), a clutch engagement shock or clutch slipping due to the insufficient hydraulic pressure described above is not caused.

In step S11, as shown in FIG. 3, it is determined whether or not an engine compulsory starting request (see step S6 described above) is made. In the case where it is determined that an engine compulsory starting request is made (YES in step S11), it is determined whether or not forward gears are prohibited, that is, the transmission 6 is in the neutral state (step S12). In the case where it is determined that forward gears are not prohibited (the transmission 6 is not in the neutral state) (NO in step S12), a predetermined hydraulic pressure integral rotation value is decided in accordance with a hydraulic pressure compensation map (step S13). In step S14, forward gears are prohibited. In step S15, operation of the fuel injection/ignition control device 7 is controlled to compulsorily start the engine 2. That is, at time t2 of FIG. 4, the first gear (first speed gear) in the in-gear condition is released (disengaged) and the clutch is completely disengaged irrespective of whether the forward clutch is engaged to bring the transmission 6 into the neutral state (here, referred to as "prohibition of forward gears"), and after such prohibition of forward gears, the engine 2 is compulsorily re-started. The function of the "compulsory starting section" is implemented by the processes in steps S11 to S15.

Figure 5:
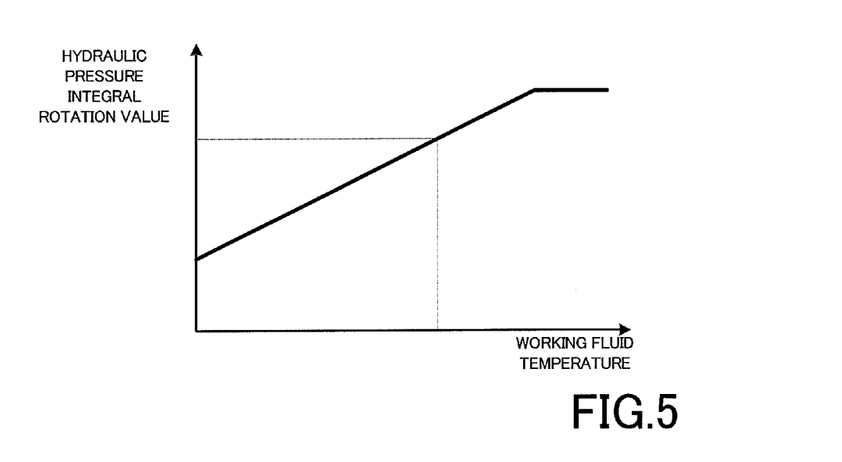
FIG. 5 shows the characteristics defined by a hydraulic pressure compensation map showing the relationship between the working fluid temperature and the hydraulic pressure integral rotation value.

Here, the hydraulic pressure compensation map will be described with reference to FIG. 5. FIG. 5 shows the characteristics defined by a hydraulic pressure compensation map showing the relationship between the working fluid temperature and the hydraulic pressure integral rotation value. As can be understood from FIG. 5, the hydraulic pressure interpolation map shows that a larger hydraulic pressure integral rotation value is used as the oil temperature of working fluid (ATF) becomes higher. This is because as the fluid temperature becomes higher, the flowability of working fluid becomes higher, resulting in more working fluid or hydraulic pressure leak in each valve body included in the hydraulic pressure control circuit 20, and thus a larger hydraulic pressure integral rotation value corresponding to the hydraulic pressure is used in advance in the case where the oil temperature of working fluid is higher in order to reliably resolve an insufficient hydraulic pressure in association with the process in step S17 to be discussed later.

In the embodiment, a hydraulic pressure required to drive the transmission 6 (more particularly, to engage the forward clutch) is calculated on the basis of an integral (engine (or main shaft) rotational speed integral) obtained by temporally integrating the rotational speed of the engine 2 (or main shaft) detected by the engine speed sensor 18. That is, the amount of oil supplied by the mechanical oil pump 11 which is mechanically driven by the drive force of the engine 2 is temporally integrated to predict a hydraulic pressure in accordance with the integrated amount. Thus, in order for comparison and determination as to whether or not the hydraulic pressure is insufficient (see step S17), the hydraulic pressure integral rotation value (more particularly, a specific engine (or main shaft) rotational speed integral corresponding to the minimum hydraulic pressure required to maintain the forward clutch engagement) is decided as an index for comparison with the engine (or main shaft) rotational speed integral as described above in consideration of the oil temperature. This advantageously allows the hydraulic pressure to be measured using the existing inexpensive rotational speed sensor (engine (or main shaft) speed sensor 18) without providing an additional expensive hydraulic pressure sensor.

Returning to the description of FIG. 3, the process returns to step S11 after the process in step S15. In this case, forward gears have been prohibited in step S14, and thus it is determined in step S12 that forward gears are prohibited (YES in step S12). Thus, the rotational speed of the engine (or main shaft) is integrated (step S16). In step S17, it is determined whether or not the engine (or main shaft) rotational speed integral is larger than the hydraulic pressure integral rotation value. In the case where it is determined that the engine (or main shaft) rotational speed integral is not larger than the hydraulic pressure integral rotation value (NO in step S17), the process returns to step S11 to repeatedly execute the processes in steps S11 to S17. In this case, an engine compulsory starting request is not canceled or prohibition of forward gears is not canceled. Thus, eventually in step S16, the rotational speed of the engine (or main shaft) is repeatedly integrated.

That is, as shown in FIG. 4, the engine is compulsorily started at time t2, along with which the rotational speed of the engine (or the rotational speed of the main shaft) is raised. Thus, the engine (or main shaft) rotational speed integral is gradually raised until the hydraulic pressure integral rotation value is exceeded after time t2. Along with such a raise, the line pressure is also gradually raised, but the forward clutch pressure remains unchanged at a low value even if the line pressure is gradually raised (time t2 to time t3) because the clutch remains disengaged after time t2 at which it was disengaged.

On the other hand, in the case where it is determined that the engine (or main shaft) rotational speed integral is larger than the hydraulic pressure integral rotation value (YES in step S17), prohibition of forward gears is canceled (step S18). That is, in the case where it can be determined at time t3 of FIG. 4 that the engine (or main shaft) rotation integral exceeds the hydraulic pressure integral rotation value and the insufficient hydraulic pressure is resolved, the gearshift position is moved from the neutral to the first gear (first speed gear), i.e., the first gear is re-engaged, and at the same time the forward clutch is engaged. Therefore, in FIG. 4, the forward clutch pressure is raised to a constant pressure after time t3 at which the clutch is engaged. The function of the "re-engagement section" is implemented by the process in step S18.

In step S19, the engine compulsory starting request is canceled (the predetermined flag which was set to 1 in step S6 is returned to 0) to complete engine compulsory starting (process). Thereafter, the process returns to step S11. In this case, the engine compulsory starting request has been canceled. Thus, it is determined in step S11 that an engine compulsory starting request is not made (NO in step S11), and the engine (or main shaft) rotational speed integral is cleared (step S20) to terminate the process.

As has been described above, the control device (engine ECU) for a vehicle according to the present invention, in the case where the electric oil pump 12 is faulty, performs a control in such a manner that the in-gear (engagement) condition of the first gear (first speed gear) is automatically canceled and the clutch engagement is released to thereby bring the transmission 6 into the neutral state, and thereafter the engine 2 is compulsorily re-started. Then, the control device performs a control so that and the in-gear condition of the first gear (first speed gear) is automatically accomplished, i.e., the first gear is re-engaged, and the clutch is engaged again after a sufficient hydraulic pressure is secured by operation of the mechanical oil pump 11 accompanied by re-starting of the engine 2. This eliminates a clutch engagement shock or clutch slipping due to an insufficient hydraulic pressure caused by a fault (faulty drive) of the electric oil pump when the engine is compulsorily started immediately after the engine is automatically stopped. Thus, a reduction in durability of the automatic transmission is prevented.

While an embodiment has been described above with reference to the drawings, the present invention is not limited thereto, and may be modified in various ways. For example, in the embodiment discussed above, the control device for a vehicle according to the present invention is applied to a hybrid vehicle in which an engine and an electric motor are used as drive force producing means. However, the present invention is not limited thereto, and the control device may be applied to a vehicle in which only an engine is used as drive force producing means.

In addition, in the embodiment discussed above, the motor generator 3 which produces a drive force is used to crank the engine 2 to compulsorily start the engine after the engine is automatically stopped. However, the present invention is not limited thereto, and it is a matter of course that the engine may be cranked to start using a dedicated motor.

The hydraulic pressure required to drive the transmission 6 may be detected by providing a hydraulic pressure sensor, rather than using an integral obtained by temporally integrating the rotational speed detected by the engine speed sensor 18.

What is claimed is:

1. A control device for a vehicle, the vehicle having power sources for driving the vehicle which include an engine driven by combustion of fuel and an electric motor driven by electric energy, the vehicle further including a transmission disposed in a power transfer mechanism provided between at least either one of the engine or the electric motor and a drive wheel, a mechanical-type oil pump driven by at least either one of the engine or the electric motor to supply working fluid to the transmission, an electrically driven-type oil pump driven by an electric motor to supply working fluid to the transmission, and a rotational speed sensor that detects a rotational speed of the engine or a rotational speed of a main shaft to which rotation of the engine is transferred, the control device comprising:

a processor unit configured to:

automatically stop the engine under predetermined conditions;

determine whether the electrically driven-type oil pump is out of order or not;

in the case where it is determined that the electrically driven-type oil pump is out of order, disengage a gear that has been in engagement in the transmission when the engine is automatically stopped and disengage a clutch for a forward gear to thereby bring the transmission into a neutral state, and thereafter compulsorily re-start the engine which has been automatically stopped;

calculate a rotational speed integral value by integrating over time the rotational speed of the engine or the rotational speed of the main shaft based on the output from the rotational speed sensor;

determine a hydraulic pressure integral rotation value corresponding to a minimum hydraulic pressure necessary to maintain the clutch for the forward gear in an engaged state on the basis of a temperature of working fluid supplied to the transmission by the mechanical-type oil pump, determining the hydraulic pressure integral rotation value so as to compensate for variations in hydraulic pressure corresponding to an amount of leak that becomes larger as the oil temperature becomes higher; and re-engage the disengaged gear and re-engage the disengaged clutch for the forward gear when the rotational speed integral value of the engine or the main shaft which has been integrated from a time point of the re-starting of the engine becomes equal to or more than the determined hydraulic pressure integral rotation value.

2. A computer-implemented method for controlling a vehicle, the vehicle having power sources for driving the vehicle which include an engine driven by combustion of fuel and an electric motor driven by electric energy, the vehicle further including a transmission disposed in a power transfer mechanism provided between at least either one of the engine or the electric motor and a drive wheel, a mechanical-type oil pump driven by at least either one of the engine or the electric motor to supply working fluid to the transmission, an electrically driven-type oil pump driven by an electric motor to supply working fluid to the transmission, and a rotational speed sensor that detects a rotational speed of the engine or a rotational speed of a main shaft to which rotation of the engine is transferred, the method comprising:

automatically stopping the engine under predetermined conditions;

determining whether the electrically driven-type oil pump is out of order or not;

in the case where it is determined that the electrically driven-type oil pump is out or order, disengaging a gear that has been in engagement in the transmission when the engine is automatically stopped and disengaging a clutch for a forward gear to thereby bring the transmission into a neutral state, and thereafter compulsorily re-starting the engine which has been automatically stopped;

calculating a rotational speed integral value by integrating over time the rotational speed of the engine or the rotational speed of the main shaft based on the output from the rotational speed sensor;

determining a hydraulic pressure integral rotation value corresponding to a minimum hydraulic pressure necessary to maintain the clutch for the forward gear in an engaged state on the basis of a temperature of working fluid supplied to the transmission by the mechanical-type oil pump, the hydraulic pressure integral rotation value being determined so as to compensate for variations in hydraulic pressure corresponding to an amount of leak that becomes larger as the oil temperature becomes higher; and when the rotational speed integral value of the engine or the main shaft which has been integrated from a time point of the re-starting of the engine becomes equal to or more than the determined hydraulic pressure integral rotation value, re-engaging the disengaged gear and re-engaging the disengaged clutch for the forward gear.

3. A non-transitory computer-readable medium storing a program that causes a computer to execute a method to control a vehicle, the vehicle having power sources for driving the vehicle which include an engine driven by combustion of fuel and an electric motor driven by electric energy, the vehicle further including a transmission disposed in a power transfer mechanism provided between at least either one of the engine or the electric motor and a drive wheel, a mechanical-type oil pump driven by at least either one of the engine or the electric motor to supply working fluid to the transmission, an electrically driven-type oil pump driven by an electric motor to supply working fluid to the transmission, and a rotational speed sensor that detects a rotational speed of the engine or a rotational speed of a main shaft to which rotation of the engine is transferred, the method comprising:

automatically stopping the engine under predetermined conditions;

determining whether the electrically driven-type oil pump is out of order or not;

in the case where it is determined that the electrically driven-type oil pump is out of order, disengaging a gear that has been in engagement in the transmission when the engine is automatically stopped and disengaging a clutch for a forward gear to thereby bring the transmission into a neutral state, and thereafter compulsorily re-starting the engine which has been automatically stopped;

calculating a rotational speed integral value by integrating over time the rotational speed of the engine or the rotational speed of the main shaft based on the output from the rotational speed sensor;

determining a hydraulic pressure integral rotation value corresponding to a minimum hydraulic pressure necessary to maintain the clutch for the forward gear in an engaged state on the basis of a temperature of working fluid supplied to the transmission by the mechanical-type oil pump, the hydraulic pressure integral rotation value being determined so as to compensate for variations in hydraulic pressure corresponding to an amount of leak that becomes larger as the oil temperature becomes higher; and when the rotational speed integral value of the engine or the main shaft which has been integrated from a time point of the re-starting of the engine becomes equal to or more than the determined hydraulic pressure integral rotation value, re-engaging the disengaged gear and re-engaging the disengaged clutch for the forward gear.

* * * * *